United States Patent [19]
Ikeda et al.

[11] Patent Number: 5,864,115
[45] Date of Patent: Jan. 26, 1999

[54] CONSUMABLE ELECTRODE TYPE ARC WELDING METHOD AND DEVICE

[75] Inventors: Kazuhiro Ikeda, Hirakata; Takayuki Murata, Akashi; Hiroaki Kitatsuji, Kakogawa; Hideki Futayabu, Kobe, all of Japan

[73] Assignee: Kawasaki Jukogyo Kabushiki Kaisha, Hyogo, Japan

[21] Appl. No.: 909,440

[22] Filed: Jul. 28, 1997

[30] Foreign Application Priority Data

Jul. 30, 1996 [JP] Japan .................................. 8-217831

[51] Int. Cl.$^6$ .................................................. B23K 9/095
[52] U.S. Cl. .............................. 219/130.21; 219/124.34; 219/125.12
[58] Field of Search .................... 219/130.21, 124.34, 219/125.12

[56] References Cited

U.S. PATENT DOCUMENTS

| 4,816,641 | 3/1989 | Sugitani et al. | 219/130.21 |
| 4,988,201 | 1/1991 | Sugitani et al. | 219/124.34 |
| 5,532,452 | 7/1996 | Lechner et al. | 219/124.34 |

FOREIGN PATENT DOCUMENTS

| 55-133880 | 10/1980 | Japan . |
| 56-80376 | 1/1981 | Japan . |
| 56-80377 | 1/1981 | Japan . |
| 58-122179 | 7/1983 | Japan . |
| 60-54011 | 3/1985 | Japan . |
| 62-34669 | 2/1987 | Japan . |
| 63-40677 | 2/1988 | Japan . |
| 4-9278 | 1/1992 | Japan . |

*Primary Examiner*—Clifford C. Shaw
*Attorney, Agent, or Firm*—Marshall, O'Toole, Gerstein, Murray & Borun

[57] ABSTRACT

Provided is a consumable electrode type arc welding method and device in which stable welding can be performed at a high speed for a welding gap greater than a thickness of a base metal and the like, and welding conditions are automatically changed according to the welding gap along a welding line to perform the stable welding. A first base metal extended vertically and a second base metal which has an upper end positioned in a middle portion of the first base metal and is provided along the first base metal are welded together. The first and second base metals have a thickness of 2.8 mm, and an arc is generated toward an upper end portion of the second base metal from obliquely above on a side opposite to the first base metal. The second base metal is melted to be a part of a weld metal. An amount of the second base metal to be melted is increased or decreased according to a welding gap detected by a laser sensor.

18 Claims, 5 Drawing Sheets

CONSUMABLE ELECTRODE TYPE ARC WELDING METHOD AND DEVICE

FIELD OF THE INVENTION

The present invention relates to a consumable electrode type arc welding method and device for welding a base metal having a welding gap.

DESCRIPTION OF THE RELATED ART

FIG. 10 is a typical diagram for explaining welding performed by a consumable electrode type arc welding device according to the prior art. In FIG. 10, the reference numeral 1 denotes a first base metal which is extended vertically, and the reference numeral 2 denotes a second base metal which has an upper end positioned in a middle portion of the first base metal 1 and is provided along the first base metal 1. The first and second base metals 1 and 2 are formed of thin plates having a thickness t of about 2.8 mm. A welding gap G is formed between the first base metal 1 and the upper end of the second base metal 2. The welding gap G is generated at a sheet metal working step or a press step of the first and second base metals 1 and 2.

In FIG. 10, the reference numeral 33 denotes a welding wire which passes through a contact chip (not shown) in a welding torch (not shown) fed toward the first and second base metals 1 and 2 by a wire feeder (not shown). An arrow shown in FIG. 10 indicates a position targeted by the welding wire 33 and a position where an extension of an upper end face of the second base metal 2 and a surface of the first base metal 1 intersect.

In the welding, a positive electrode of a welding supply (not shown) is generally connected to the welding wire 33, and a negative electrode of the welding supply is connected to the first and second base metals 1 and 2. An arc is generated between a tip portion of the welding wire 33 and the first and second base metals 1 and 2 while feeding the welding wire 33 in a direction shown by the arrow in FIG. 10. A tip side of the welding wire 33 is melted by the generated arc, thereby forming a weld metal between the first and second base metals 1 and 2. Thus, the welding is performed so as to fill the welding metal in the welding gap G. By such a method, if the welding gap G has a size of about 2 to 3 mm or less, the welding can be performed comparatively stably.

According to the conventional arc welding device and method described above, the welding can be performed comparatively stably for the welding gap G having a size of about 2 to 3 mm or less. However, even if the first and second base metals 1 and 2 have a thickness of about 2.8 mm, a welding gap G having a size of about 6 to 7 mm is sometimes generated depending on an object to be welded. It is necessary to form a large amount of the weld metal for such a great welding gap G. For this purpose, it is supposed that a welding current should be increased or a welding speed should be reduced. In this case, however, arc heat input to the first and second base metals 1 and 2 is increased so that burn-through is generated on the first base metal 1 or the upper end of the second base metal 2 easily burns through. Consequently, it is difficult to form a stable bead between the first and second base metals 1 and 2.

In order to solve the above-mentioned problems, Japanese Laid Open (Unexamined) Patent Publication No. SHO 56-80376 or SHO 56-80377 has been disclosed. However, these have proposed that fusing of a welding wire is repeated several times by a short-circuit current and welding is then performed by a stationary arc. Therefore, although the burn-through of the second base metal 2 can be prevented, the welding speed is reduced.

The welding gap G is generated at the sheet metal working step or the press step of the first and second base metals 1 and 2. Therefore, the size of the welding gap G is not constant along a welding line but is usually varied. Japanese Laid Open (Unexamined) Patent Publications Nos. SHO 58-122179 and SHO 60-54011 have disclosed that a welding path provided along a welding line is automatically generated to perform welding. Furthermore, it is necessary to meet a demand that welding conditions are automatically changed according to the size of the welding gap G which is varied along the welding line so that stable welding can be performed.

SUMMARY OF THE INVENTION

In order to eliminate the above-mentioned drawbacks according to the prior art, it is an object of the present invention to provide a consumable electrode type arc welding method and device capable of performing stable welding at a high speed for a welding gap and the like having a greater size than a thickness of a base metal, and of automatically changing welding conditions according to the size of the welding gap which is varied along a welding line to perform the stable welding.

The present invention provides a consumable electrode type arc welding method for welding a first base metal extended vertically, and a second base metal formed of a thin plate which has an upper end positioned in a middle portion of the first base metal and is provided along the first base metal, comprising the steps of generating an arc in a direction of an upper end portion of the second base metal from obliquely above on a side opposite to a first base metal, and melting the second base metal by a predetermined height from the upper end thereof and making the melted second base metal as a part of a weld metal; detecting a welding gap between the first base metal and the upper end portion of the second base metal; and increasing the predetermined height of the second base metal to be melted when the welding gap is greater.

The present invention also provides a consumable electrode type arc welding device for welding a first base metal extended vertically, and a second base metal formed of a thin plate which has an upper end positioned in a middle portion of the first base metal and is provided along the first base metal, comprising arc generating means for generating an arc in a direction of an upper end portion of the second base metal from obliquely above on a side opposite to the first base metal, and melting the second base metal by a predetermined height from the upper end thereof and making the melted second base metal as a part of a weld metal; detecting means for detecting a welding gap between the first base metal and the upper end portion of the second base metal; and control means for controlling the arc generating means so as to increase the predetermined height of the second base metal to be melted when the welding gap is greater.

In the consumable electrode type arc welding method or device according to the present invention, the second base metal is melted to be a part of a weld metal. Therefore, an amount of the weld metal can be increased for the same welding current. In addition, since the second base metal is melted by the predetermined height from the upper end thereof, heat input to the first base metal is limited so that burn-through of the first base metal can be prevented from being generated. Furthermore, arc force acts on a melted portion of the second base metal obliquely downward, that is, to the first base metal side, nonconformity can be prevented from being caused by the burn-through of the second base metal. Accordingly, it is possible to perform stable welding for the welding gap which is greater than a thickness of the second base metal.

A first additional feature of the consumable electrode type arc welding method according to the present invention is that the predetermined height of the second base metal to be melted is increased or decreased by changing a welding current.

A first additional feature of the consumable electrode type arc welding device according to the present invention is that the control means controls the arc generating means so as to increase or decrease the predetermined height of the second base metal to be melted by changing a welding current.

In the consumable electrode type arc welding method or device having the first additional feature according to the present invention, an amount of the second base metal to be melted is increased or decreased by the welding current. Consequently, a welding speed can be kept so that stable welding can be performed at a high speed. In addition, the welding conditions can automatically be changed to perform the stable welding by changing the welding current depending on the welding gap.

A second additional feature of the consumable electrode type arc welding method according to the present invention is that the predetermined height of the second base metal to be melted is increased or decreased by changing a welding speed.

A second additional feature of the consumable electrode type arc welding device according to the present invention is that the control means controls the arc generating means so as to increase or decrease the predetermined height of the second base metal to be melted by changing a welding speed.

In the consumable electrode type arc welding method or device having the second additional feature according to the present invention, stable welding can surely be performed for a greater welding gap.

A third additional feature of the consumable electrode type arc welding method according to the present invention is that when the welding gap has a predetermined value or more, the welding current is limited to a smaller value as the value of the gap becomes greater.

A third additional feature of the consumable electrode type arc welding device according to the present invention is that when the welding gap has a predetermined value or more, the control means performs control to limit the welding current to a smaller value as the value of the gap becomes greater.

In the consumable electrode type arc welding method or device having the third additional feature according to the present invention, welding can surely be performed without causing undercut and burn-through for the greater welding gap.

A fourth additional feature of the consumable electrode type arc welding method according to the present invention is that when the welding gap has a predetermined reference value or more, the generated arc is caused to oscillate so as to have an oscillating component in a direction orthogonal to a welding line.

A fourth additional feature of the consumable electrode type arc welding device according to the present invention is that the control means controls the arc generating means so as to cause the generated arc to oscillate to have an oscillating component in a direction orthogonal to a welding line when the welding gap has a predetermined reference value or more. In the consumable electrode type arc welding method or device having the fourth additional feature according to the present invention, since the arc is caused to oscillate, a bead having a great width can stably be formed. Consequently, stable welding can be performed for the greater welding gap.

A fifth additional feature of the consumable electrode type arc welding method according to the present invention is that the arc is caused to oscillate in such a manner that an amplitude is increased when the welding gap becomes greater.

A fifth additional feature of the consumable electrode type arc welding device according to the present invention is that the control means controls the arc generating means in such a manner that an amplitude of the oscillating arc is increased when the welding gap becomes greater.

In the consumable electrode type arc welding method or device having the fifth additional feature according to the present invention, the amplitude of oscillation is changed corresponding to the size of the welding gap. Therefore, the welding conditions are automatically changed corresponding to the welding gap so that stable welding can be performed for the greater welding gap.

A sixth additional feature of the consumable electrode type arc welding method according to the present invention is that when the amplitude of the oscillating arc is increased, the welding speed is reduced.

A sixth additional feature of the consumable electrode type arc welding device according to the present invention is that the control means controls the arc generating means in such a manner that the welding speed is reduced when the amplitude of the oscillating arc is increased.

In the consumable electrode type arc welding method or device having the sixth additional feature according to the present invention, more stable welding can be performed for the greater welding gap.

A seventh additional feature of the consumable electrode type arc welding method according to the present invention is that the arc is generated toward a vicinity of a corner of a side opposite to the first base metal on the upper end of the second base metal.

A seventh additional feature of the consumable electrode type arc welding device according to the present invention is that the arc generating means generate the arc toward a vicinity of a corner of a side opposite to the first base metal on the upper end of the second base metal.

In the consumable electrode type arc welding method or device having the seventh additional feature according to the present invention, stable welding can surely be performed.

An eighth additional feature of the consumable electrode type arc welding method according to the present invention is that a welding wire having a diameter of about 1.2 to 1.4 mm is used for the second base metal having a thickness of about 2.4 to 3.2 mm, the arc is generated at a horizontal angle of about 25° to 50° to a region around the corner of the second base metal, and the region is formed between a position on an upper end face of the second base metal having a distance of about 1 mm from the corner and a position on the side face opposite to the first base metal having a downward distance of about 1 mm from the corner.

An eighth additional feature of the consumable electrode type arc welding device according to the present invention is that a welding wire having a diameter of 1.2 to 1.4 mm is used for the second base metal having a thickness of about 2.4 to 3.2 mm, the arc generating means generate the arc at a horizontal angle of about 25° to 50° to a region around the corner of the second base metal, and the region is formed between a position on an upper end face of the second base metal having a distance of about 1 mm from the corner and a position on the side face opposite to the first base metal having a downward distance of about 1 mm from the corner.

In the consumable electrode type arc welding method or device having the eighth additional feature according to the present invention, stable welding can be performed more surely.

DETAILED DESCRIPTION OF THE INVENTION

A preferred embodiment of a consumable electrode type arc welding device according to the present invention will be described below in detail together with a preferred embodiment of a consumable electrode type arc welding method with reference to the drawings.

Figure 3:
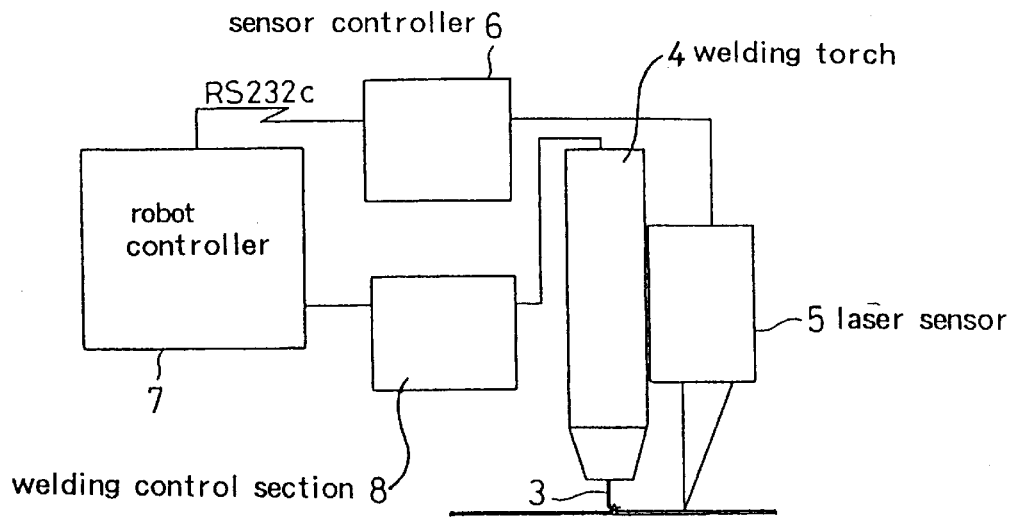
FIG. 3 is a schematic diagram showing a system of an example of the arc welding device.

FIG. 3 is a schematic diagram showing a system of the arc welding device. In FIG. 3, the reference numeral 5 denotes a laser sensor (detecting means) for detecting a size of a welding gap G, a position of a welding line and the like. An output signal of the laser sensor 5 is amplified and processed by a sensor controller 6, and is sent to a robot controller (control means) 7 through a RS232C communication line. The reference numeral 4 denotes a welding torch, and the reference numeral 8 denotes a welding control section including an arc control section 8b (See FIG.4) having a welding supply and a welding wire feeder, a robot arm 8a (See FIG. 4) for moving the welding torch 4 and the like. The welding control section 8 and the welding torch 4 form arc generating means. Power given from the welding supply causes an arc to be generated between the base metal and a welding wire 3 having a diameter of about 1.2 to 1.4 mm sent from the welding torch 4 toward the base metal on the welding line.

Figure 4:
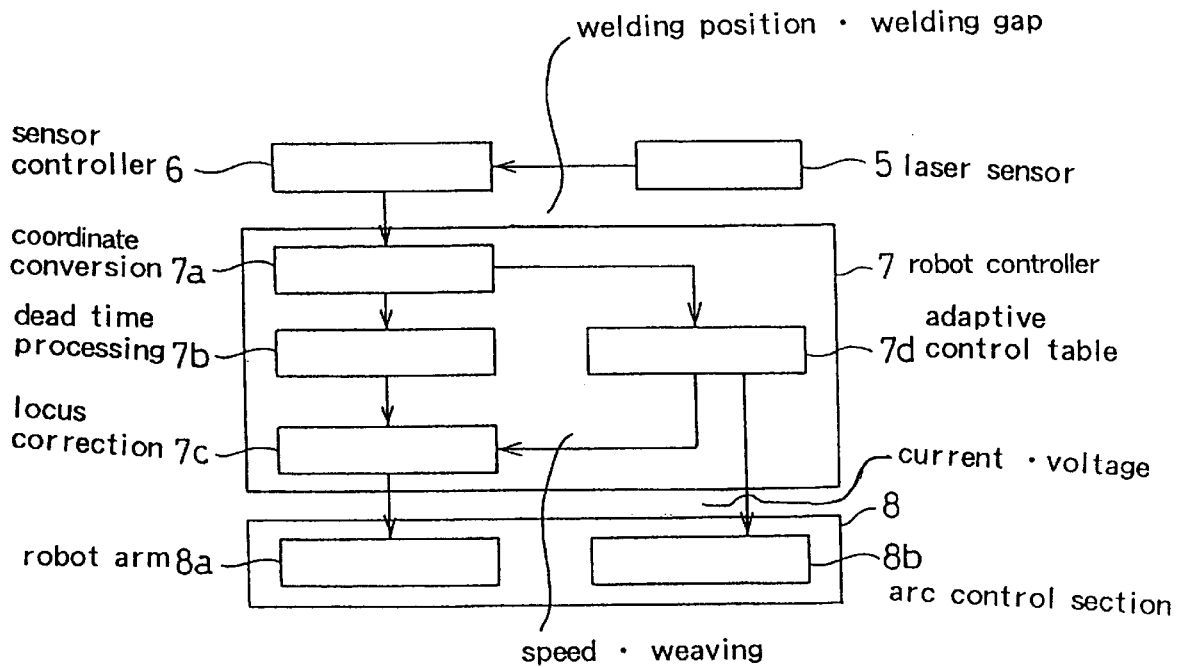
FIG. 4 is a block diagram for explaining control operation of the arc welding device.

FIG. 4 is a block diagram for explaining control operation of the arc welding device. Laser beams are emitted from the laser sensor 5 toward the base metal, and an output signal based on reflected light is sent to the sensor controller 6. The sensor controller 6 amplifies and processes the signal as described above, and sends, to the robot controller 7, a welding position calculated by a sensor coordinate system, a gap width and the like. The robot controller 7 is formed by using an integrated circuit including the function of a microcomputer, and serves to perform a coordinate conversion 7a for the received signal and to grasp a position targeted by the welding wire 3 and the size of the welding gap G by a robot coordinate system. By using this result, a necessary control value is read from an adaptive control table 7d to control a current, a voltage and the like of the arc control section 8b and to perform a locus correction 7c of the robot arm 8a. The reference numeral 7b denotes a dead time processing of performing the proper locus correction 7c and the like in consideration of a time required for transmission from the sensor controller 6 to the robot controller 7.

Figure 1:
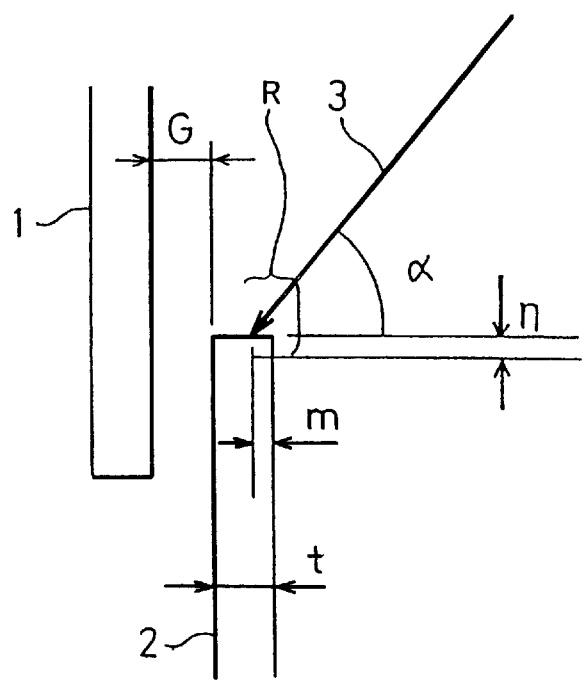
FIG. 1 is a typical diagram for explaining welding performed by an arc welding method or device according to the present invention.

Operation of the arc welding device will be described below. FIG. 1 is a diagram for explaining the welding base metal and the position targeted by the welding wire 3. The welding base metal includes a first base metal 1 extended vertically, and a second base metal 2 which has an upper end positioned in a middle portion of the first base metal 1 and is provided along the first base metal 1. A welding gap G having a size of about 0 to 7 mm is formed between the first and second base metals 1 and 2. The first and second base metals 1 and 2 are formed of thin plates having a thickness t of about 2.8 mm, and are made of rolled steel sheets. When a position of the upper end of the second base metal 2 is detected by the laser sensor 5, the robot controller 7 controls the robot arm 8a. The position targeted by the welding wire 3 is set in a region R formed around a corner on a side opposite to the first base metal 1 on the upper end of the second base metal 2. The region R is formed between a position on the upper end face with a distance m of about 1 mm apart from the corner and a position on a side face opposite to the first base metal 1 with a downward distance n of about 1 mm. The welding wire 3 is fed from obliquely above on the side opposite to the first base metal 1 with a torch angle (α) of about 25° to 50° horizontal to the target position. The target position and the torch angle are set into such a range that effects of the present invention can surely be obtained. Even if they depart from this range, all the effects of the present invention are not eliminated.

Figure 2:
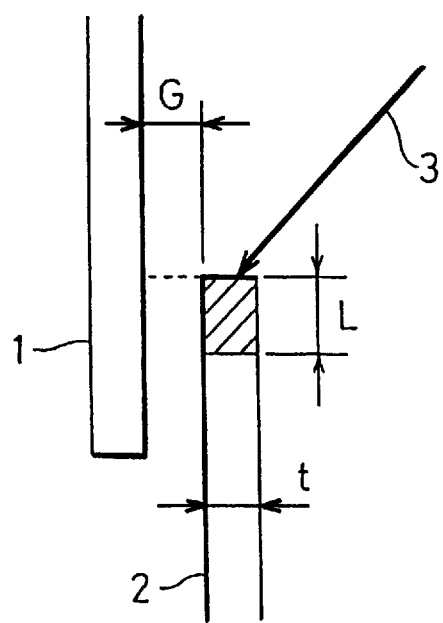
FIG. 2 is a typical diagram for explaining an example of the welding method.
Figure 7:
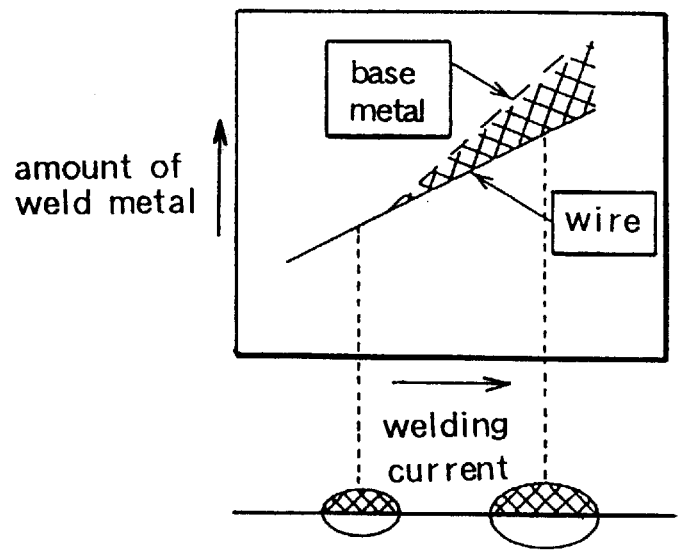
FIG. 7 is a graph showing a relationship between an amount of a weld metal and a welding current.
Figure 9:
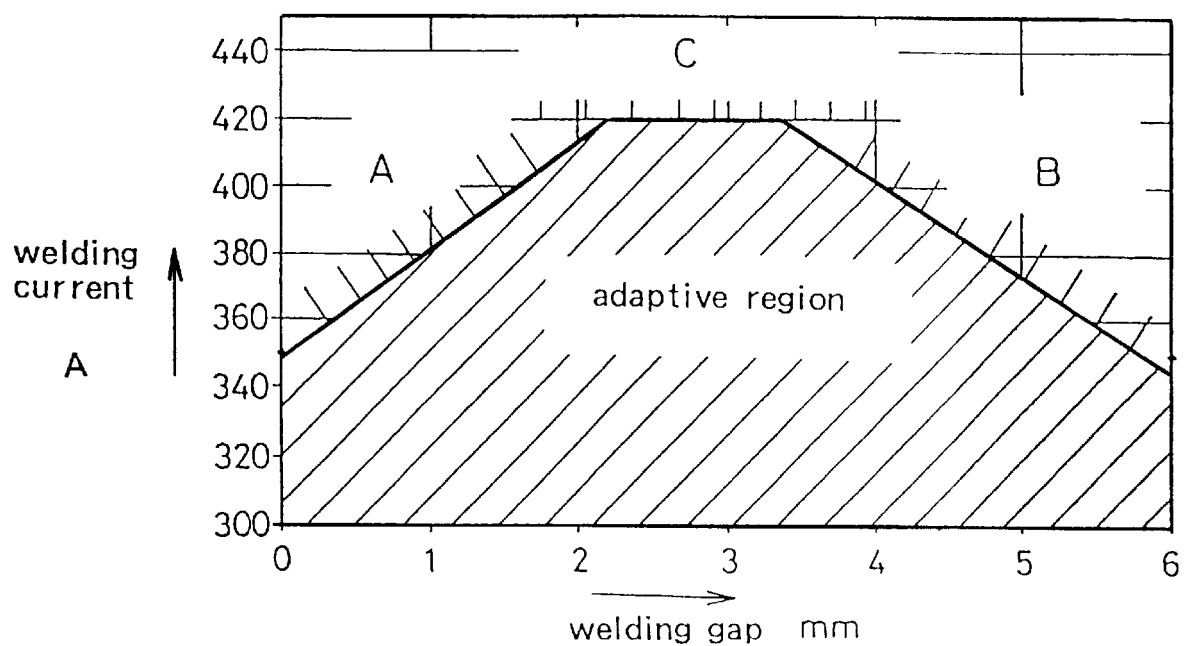
FIG. 9 is a graph showing an adaptive control region of the welding current.
Figure 10:
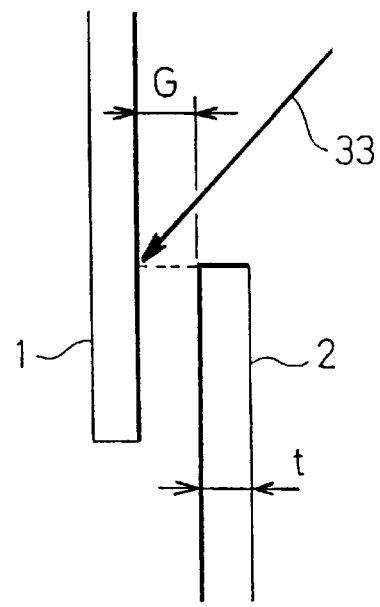
FIG. 10 is a typical diagram for explaining welding according to the prior art.

FIG. 2 is a diagram for explaining welding performed by the above-mentioned arc welding device. As described with reference to FIG. 1, when the welding wire 3 is fed, the arc is generated from obliquely above on the side opposite to the first base metal 1 with respect to the upper end of the second base metal 2. Consequently, the second base metal 2 is melted by the arc and flows to the first base metal 1 side for a predetermined height L from the upper end thereof by an arc pressure so as to become a part of a weld metal cross linking the welding gap G. An amount of the melted second base metal 2 is increased with an increase in the welding current. As shown in FIG. 7, therefore, the total amount of the weld metal is increased still more when the welding current is increased as compared with the conventional arc welding device for generating the weld metal almost only by the melting of the welding wire 3. The welding current is controlled according to the size of the welding gap G detected by the laser sensor 5, thereby increasing or decreasing the amount of the weld metal. In other words, if the welding gap G is greater, the amount of the weld metal is increased. However, a feeding speed of the welding wire 3 has limitations. For this reason, in the case where the amount of the weld metal should be increased beyond the limitations, the robot arm 8a is controlled to reduce the welding speed. An adaptive control range of the welding current is shown by an oblique line in FIG. 9. In a region A, a humping bead is generated. In a region B, undercut and burn-through are caused. In a region C, the feeding speed of the welding wire 3 exceeds an upper limit. Accordingly, if the welding gap G is great, the welding current is lowered in such a manner that an operating point does not enter the region B, which is compensated for by reducing the welding speed. In the arc welding device, the amount of the melted second base metal 2 is increased or decreased according to the size of the welding gap G detected as described above. In this case, the size of the welding gap G and the predetermined height L of the second base metal 2 to be melted has a relationship shown in Table 1.

TABLE 1

| Gap G (mm) | Burn-through Height L (mm) |
| --- | --- |
| 0 | 2 |
| 1 | 3 |
| 2 | 4 |
| 3 | 5 |
| 4 | 6 |

Figure 5:
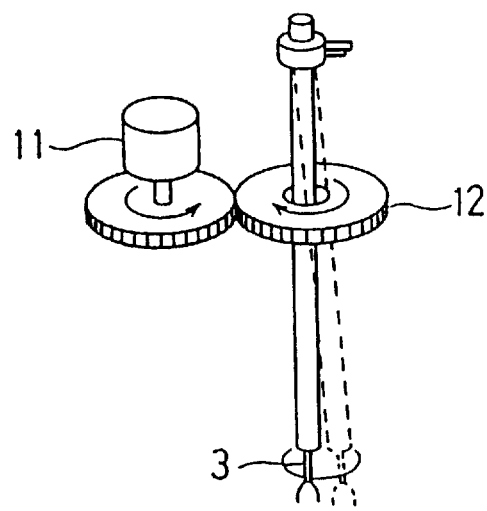
FIG. 5 is a perspective view showing a mechanism for performing a rotational arc.
Figure 6:
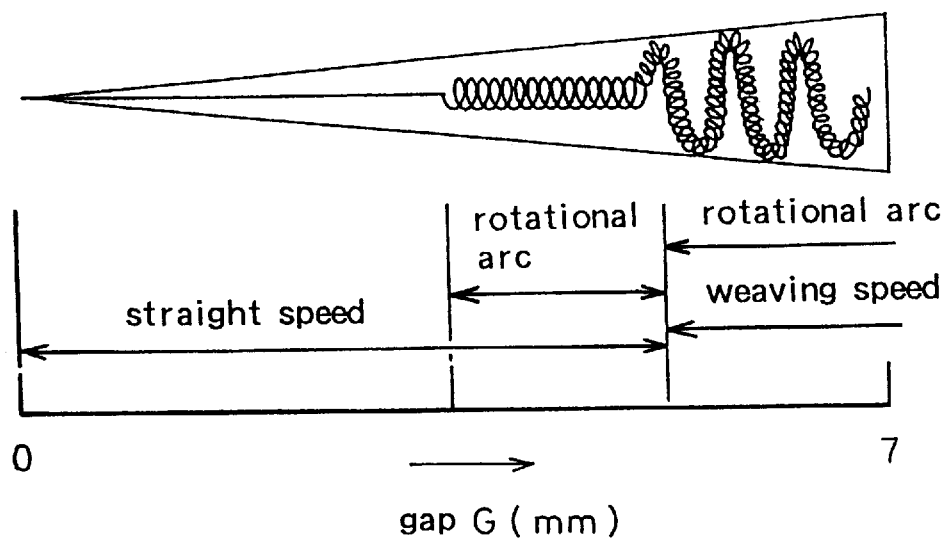
FIG. 6 is a diagram showing a locus of an arc.

When the welding gap G is 3.5 mm or more, the welding device performs welding by a high-speed rotational arc. In a mechanism shown in FIG. 5, the tip of the welding wire 3 is caused to rotate at a high speed by action of a rotary motor 11 and an eccentric gear 12 including a selfaligning bearing. For example, a rotational frequency is set to about 60 Hz when the welding gap G is about 3.5 mm, and is set to about 100 Hz when the welding gap G is 6 to 7 mm. Thus, the rotation is performed at a higher speed with an increase in the welding gap G. Furthermore, when the welding gap G is 5.2 mm or more, weaving of the welding wire 3 is additionally performed. By driving a torch moving mechanism of the robot arm 8a and the like, the generated arc is caused to oscillate so as to have an oscillating component in a direction orthogonal to the welding line. An amplitude is made greater when the welding gap G is increased. For example, the amplitude is about 1.0 mm when the welding gap G is 5.2 mm, and is about 1.5 mm when the welding gap G is 6 to 7 mm. FIG. 6 typically shows a locus of the above-mentioned rotational arc and an arc obtained by performing the weaving. As a result of the weaving, the movement of the arc includes a component orthogonal to the welding line. Therefore, the welding speed is reduced according to the amplitude.

In the arc welding device having the above-mentioned structure and the arc welding method using the arc welding device, the second base metal 2 is melted to be a part of a weld metal. Accordingly, an amount of the weld metal is increased more than in the prior art and stable welding can be performed with a great welding gap G. In addition, dispersion of heat input is controlled according to the position targeted by the arc so that stable welding can be performed. More specifically, the position targeted by the arc is set in the vicinity of an upper end corner of the second base metal 2, on which the arc is generated from obliquely above. Therefore, the heat input to be given to the first base metal 1 is decreased so that burn-through and the like can be prevented. Furthermore, the second base metal 2 is melted by a predetermined height L from the upper end thereof, and causes arc force to act in a direction of the first base metal 1 so that a bead is formed between the first and second base metals 1 and 2 in a portion which has not been melted. Consequently, it is possible to solve a problem according to the prior art that the second base metal 2 burns through so that welding is performed unstably. The amount of the melted second base metal 2 is increased or decreased by the welding current according to the size of the welding gap G detected by the laser sensor 5. Therefore, the welding conditions can automatically be changed according to the welding gap G and a necessary amount of the second base metal 2 can be melted to form a stable bead. In addition, the welding speed can be kept high. When the feeding speed of the welding wire 3 reaches an upper limit, the welding speed is reduced to increase the amount of the weld metal. Furthermore, the welding current is restricted for the welding gap G having a predetermined value or more so as not to enter the region B shown in FIG. 9. Accordingly, welding can surely be performed without causing undercut and burn-through for a greater welding gap G.

In the above description, when the welding gap G is 3.5 mm or more, the welding is performed by the rotational arc. Consequently, an arc pressure, arceat and the like are uniformly dispersed for a molten pool. Therefore, a shape formed by the burn-through of the weld metal is changed from a centralization type to a marginal dispersion type and a surface of the bead is also flattened. In addition, when the welding gap G is 5.2 mm or more, the weaving is performed. Accordingly, even if a bead width is increased, stable welding can be performed. The amplitude of the weaving is increased or decreased depending on the width of the welding gap G which is detected. Correspondingly, the welding speed is controlled. Consequently, the first and second base metals 1 and 2 having a thickness t of 2.8 mm can stably be welded up to the welding gap G having a size of about 6 to 7 mm which is detected by the laser sensor 5. By using the weaving and the rotational arc together, high-speed critical bumping is caused with difficulty due to an apparent reduction in the arc force. Consequently, the welding speed can be increased.

The welding line is usually bent according to a shape of an object to be welded and the like. Therefore, in the case where a torch angle to the first and second base metals 1 and 2, that is, an angle of advance, an angle of retreat, a downhill, a torch angle α or the like is variously changed, welding stability is very important. As described above, since the second base metal 2 is a part of the weld metal, a full amount of the weld metal can be ensured. Consequently, also in the case where the torch angle is variously changed, full welding stability can be ensured.

Figure 8:
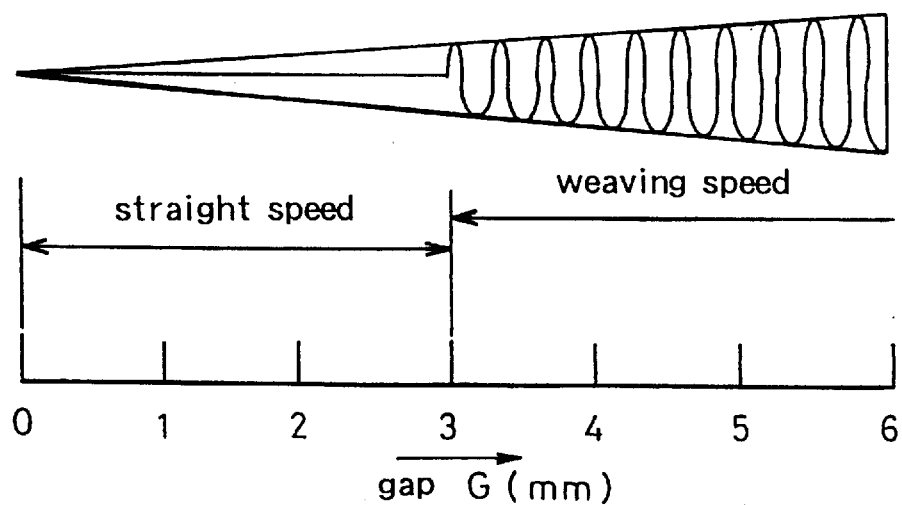
FIG. 8 is a diagram showing a locus of an arc.

While the preferred embodiment of the present invention has been described above, the present invention is not restricted thereto but can variously be modified and embodied within the range of the invention. While the weaving and the rotational arc have been used together with the great welding gap G, only the weaving may be performed with the welding gap G of 3.5 mm or more as shown in FIG. 8. The weaving is performed by the robot arm 8a. Thus, the mechanism shown in FIG. 5 is not required. Thus, the stable welding can be performed and a device can be simplified. While the thin plate having a thickness t of about 2.8 mm has been used, the same effects can be obtained by applying the present invention to a thin plate having a thickness t of about 2.4 to 3.2 mm. The effects of the present invention can surely be obtained within the range of the thickness. It does not mean that the effects of the present invention cannot be obtained by departing from the range.

Although the present invention has fully been described by way of example with reference to the accompanying drawings, it is to be understood that various changes and modifications will be apparent to those skilled in the art.

Therefore, unless otherwise such changes and modifications depart from the scope of the invention, they should be construed as being included therein.

What is claimed is:

1. A consumable electrode type arc welding method for welding a first base metal extended vertically, and a second base metal formed of a thin plate which has an upper end positioned in a middle portion of the first base metal and is provided along the first base metal, comprising the steps of;

generating an arc in a direction of an upper end portion of the second base metal from obliquely above on a side opposite to a first base metal, and melting the second base metal by a predetermined height from the upper end thereof in the downward direction and making the melted second base metal as a part of a weld metal;

detecting a welding gap between the first base metal and the upper end portion of the second base metal; and increasing the predetermined height of the second base metal to be melted when the welding gap is greater.

2. The consumable electrode type arc welding method as defined in claim 1, wherein the predetermined height of the second base metal to be melted is increased or decreased by changing a welding current.

3. The consumable electrode type arc welding method as defined in claim 2, wherein the predetermined height of the second base metal to be melted is increased or decreased by changing a welding speed.

4. The consumable electrode type arc welding method as defined in claim 3, wherein when the welding gap has a predetermined value or more, the welding current is limited to a smaller value as the value of the gap becomes greater.

5. The consumable electrode type arc welding method as defined in claim 1, wherein when the welding gap has a predetermined reference value or more, the generated arc is caused to oscillate so as to have an oscillating component in a direction orthogonal to a welding line.

6. The consumable electrode type arc welding method as defined in claim 5, wherein the arc is caused to oscillate in such a manner that an amplitude is increased when the welding gap becomes greater.

7. The consumable electrode type arc welding method as defined in claim 6, wherein when the amplitude of the oscillating arc is increased, the welding speed is reduced.

8. The consumable electrode type arc welding method as defined in claim 1, wherein the arc is generated toward a vicinity of a corner of a side opposite to the first base metal on the upper end of the second base metal.

9. The consumable electrode type arc welding method as defined in claim 8, wherein a welding wire having a diameter of about 1.2 to 1.4 mm is used for the second base metal having a thickness of about 2.4 to 3.2 mm, and the arc is generated around the corner at a horizontal angle of about 25° to 50° to a region formed between a position on an upper end face having a distance of about 1 mm apart from the corner and a position on the side face opposite to the first base metal having a downward distance of about 1 mm.

10. A consumable electrode type arc welding device for welding a first base metal extended vertically, and a second base metal formed of a thin plate which has an upper end positioned in a middle portion of the first base metal and is provided along the first base metal, comprising;

arc generating means for generating an arc in a direction of an upper end portion of the second base metal from obliquely above on a side opposite to the first base metal, and melting the second base metal by a predetermined height from the upper end thereof and making the melted second base metal as a part of a weld metal;

detecting means for detecting a welding gap between the first base metal and the upper end portion of the second base metal; and control means is provided for controlling the arc generating means so as to increase the predetermined height of the second base metal to be melted when the welding gap is greater.

11. The consumable electrode type arc welding device as defined in claim 10, wherein the control means controls the arc generating means so as to increase or decrease the predetermined height of the second base metal to be melted by changing a welding current.

12. The consumable electrode type arc welding device as defined in claim 11, wherein the control means controls the arc generating means and so as to increase or decrease the predetermined height of the second base metal to be melted by changing a welding speed.

13. The consumable electrode type arc welding device as defined in claim 12, wherein when the welding gap has a predetermined value or more, the control means performs control to limit the welding current to a smaller value, as the value of the gap becomes greater.

14. The consumable electrode type arc welding device as defined in claim 10, wherein the control means controls the arc generating means so as to cause the generated arc to oscillate to have an oscillating component in a direction orthogonal to a welding line when the welding gap has a predetermined reference value or more.

15. The consumable electrode type arc welding device as defined in claim 14, wherein the control means controls the arc generating means in such a manner that an amplitude of the oscillating arc is increased when the welding gap becomes greater.

16. The consumable electrode type arc welding device as defined in claim 15, wherein the control means controls the arc generating means in such a manner that the welding speed is reduced when the amplitude of the oscillating arc is increased.

17. The consumable electrode type arc welding device as defined in claim 10, wherein the arc generating means generates the arc toward a vicinity of a corner of a side opposite to the first base metal on the upper end of the second base metal.

18. The consumable electrode type arc welding device as defined in claim 17, wherein a welding wire having a diameter of 1.2 to 1.4 mm is used for the second base metal having a thickness of about 2.4 to 3.2 mm, and the arc generating means generates the arc around the corner at a horizontal angle of about 25° to 50° to a region formed between a position on an upper end face having a distance of about 1 mm apart from the corner and a position on the side face opposite to the first base metal having a downward distance of about 1 mm.

* * * * *